(12) United States Patent
Ishimura (10) Patent No.: US 10,547,380 B2
(45) Date of Patent: Jan. 28, 2020

(54) POLARIZATION TRACKING DEVICE, OPTICAL RECEIVING DEVICE, AND POLARIZATION TRACKING METHOD

(71) Applicant: KDDI CORPORATION, Tokyo (JP)

(72) Inventor: Shota Ishimura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/266,712

(22) Filed: Feb. 4, 2019

(65) Prior Publication Data
US 2019/0181950 A1    Jun. 13, 2019

Related U.S. Application Data

(63) Continuation of application No. PCT/JP2017/034211, filed on Sep. 22, 2017.

(30) Foreign Application Priority Data

Sep. 27, 2016  (JP) .................................. 2016-188648

(51) Int. Cl.
*H04B 10/079* (2013.01)
*G02F 2/00* (2006.01)
(Continued)

(52) U.S. Cl.
CPC ........... *H04B 10/079* (2013.01); *G01D 5/344* (2013.01); *G01M 11/33* (2013.01); *G02F 2/00* (2013.01);
(Continued)

(58) Field of Classification Search
CPC .............. H04B 10/079; H04B 10/0795; H04B 10/07951; H04B 10/25; H04B 10/6151;
(Continued)

(56) References Cited

U.S. PATENT DOCUMENTS 7,443,504 B2 * 10/2008 Sone .......................... G01J 4/04
356/365
8,983,290 B2 * 3/2015 Kim ................... H04B 10/0775
398/33
(Continued)

FOREIGN PATENT DOCUMENTS

| JP | 2015-136015 A | 7/2015 |
| WO | 2016/162903 A1 | 10/2016 |
| WO | 2018/062010 A1 | 4/2018 |

OTHER PUBLICATIONS

Extended European Search Report for European Patent Application No. 17855964.7 dated Aug. 28, 2019.
(Continued)

*Primary Examiner* — Gordon J Stock, Jr.
(74) *Attorney, Agent, or Firm* — Thomas | Horstemeyer, LLP (57) ABSTRACT

A polarization tracking device that tracks polarization fluctuation of light using a Stokes vector, includes: an updating unit configured to express a fluctuation amount of the Stokes vector on a Poincare sphere in an xy plane perpendicular to a travelling direction of a light wave using a first and a second angles, the first angle being an angle between a direction of an electric field of the light wave and y axis, and the second angle being a phase difference between a component of the optical electric field in a direction of the y axis and a component of the optical electric field in a direction of an x axis; and an application unit configured to rotate the Stokes vector using an inverse polarization rotation matrix expressed with the first and the second angles.

8 Claims, 5 Drawing Sheets

(51) Int. Cl.
*H04B 10/61* (2013.01)
*G01D 5/34* (2006.01)
*H04B 10/25* (2013.01)
*G01M 11/00* (2006.01)
*G01J 4/00* (2006.01)

(52) U.S. Cl.
CPC ......... *H04B 10/25* (2013.01); *H04B 10/6151* (2013.01); *H04B 10/6166* (2013.01); *G01J 2004/001* (2013.01); *G02F 2201/02* (2013.01)

(58) Field of Classification Search
CPC ............ H04B 10/6162; H04B 10/6166; H04B 10/60; G01D 5/344; G02F 2201/02; G02F 2/00; G01J 4/00; G01J 4/02; G01J 4/04; G01J 2004/001; G01J 2004/002; G01J 2004/004; G01J 2004/005; G01J 2004/007; G01J 2004/008; G01M 11/30; G01M 11/33; G01M 11/332; G01M 11/333; G01M 11/336; G01M 11/337; G01M 11/338
See application file for complete search history.

(56) References Cited

U.S. PATENT DOCUMENTS

| | | | | |
|---|---|---|---|---|
| 9,143,265 | B2* | 9/2015 | Kikuchi | H04J 14/06 |
| 9,207,168 | B2* | 12/2015 | Lovely | G01N 21/21 |
| 9,876,566 | B1* | 1/2018 | Fludger | H04B 10/07951 |
| 10,395,113 | B2* | 8/2019 | Aycock | G02B 5/201 |
| 2016/0182182 | A1 | 6/2016 | Schmogrow | |

OTHER PUBLICATIONS

Che et al., Blind Polarization De-multiplexing for Stokes Vector Direct Detection, 2015 European Conference on Optical Communication (ECOC), Viajes El Corte Ingles, VECISA, Sep. 27, 2015, pp. 1-3, XP032819937.

Che et al., Implementing Simplified Stokes Vector Receiver for Phase Diverse Direct Detection, 2015 Optical Fiber Communications Conference and Exhibition (OFC), OSA, Mar. 22, 2015, pp. 1-3, XP032784313.

Che et al., 160-Gb/s Stokes Vector Direct Detection for Short Reach Optical Communication, OFC 2014, OSA, Mar. 9, 2014, pp. 1-3, XP032632824.

Di Che et al., "Polarization Demultiplexing for Stokes Vector Direct Detection", IEEE Journal of Lightwave Technology, Jan. 15, 2016, pp. 754-760, vol. 34, No. 2.

Luis et al., "Experimental Demonstration of a Polarization-Insensitive Self-Homodyne Detection Receiver for Optical Access", Optical Communication on European Conference (ECOC) 2015, Tu.3.4.7.

Di Che et al., "Stokes Vector Direct Detection for Linear Complex Optical Channels", IEEE Journal of Lightwave Technology, Feb. 1, 2015, pp. 678-684, vol. 33, No. 3.

Ishimura et al., Experimental Demonstration of Novel Simple Blind Polarzation-Demultiplexing Algorithm for Stokes Vector Direct Detection Receivers, OFC 2017, Mar. 2017.

International Search Report for PCT/JP2017/034211 dated Dec. 12, 2017 (partially translated).

* cited by examiner

POLARIZATION TRACKING DEVICE, OPTICAL RECEIVING DEVICE, AND POLARIZATION TRACKING METHOD

CROSS-REFERENCE TO RELATED APPLICATIONS

This application is a continuation of International Patent Application No. PCT/JP2017/034211 filed on Sep. 22, 2017, which claims priority to and the benefit of Japanese Patent Application No. 2016-188648 filed or Sep. 27, 2016, the entire disclosures of which are incorporated herein by reference.

TECHNICAL FIELD

The present invention relates to a technique for tracking polarization fluctuation of light transmitted through an optical fiber using a Stokes vector indicated by components of an optical electric field.

BACKGROUND ART

It is conventionally known that the polarization state of light randomly fluctuates in optical fiber transmission due to asymmetry of a core shape formed in fiber production or the application of stress in a lateral direction. Therefore, when a receiving system that is sensitive to the polarization state is used, the random polarization fluctuation needs to be tracked at all times.

In currently commercialized digital coherent optical receivers, polarization tracking is realized through the use of "digital signal processing (DSP)". This enables long-distance communication over a distance as long as approximately 8,000 km.

Meanwhile, a "self-homodyne optical transmission system" that transmits an optical carrier signal together with an optical modulation signal through polarization multiplexing is known as a simple method of digital signal processing. In this self-homodyne system as well, some polarization tracking methods using DSP have been proposed, and particularly, a "blind polarization tracking algorithm" that tracks the polarization state without using a symbol determination result is practically important in terms of downsizing the circuit scale.

Figure 5:
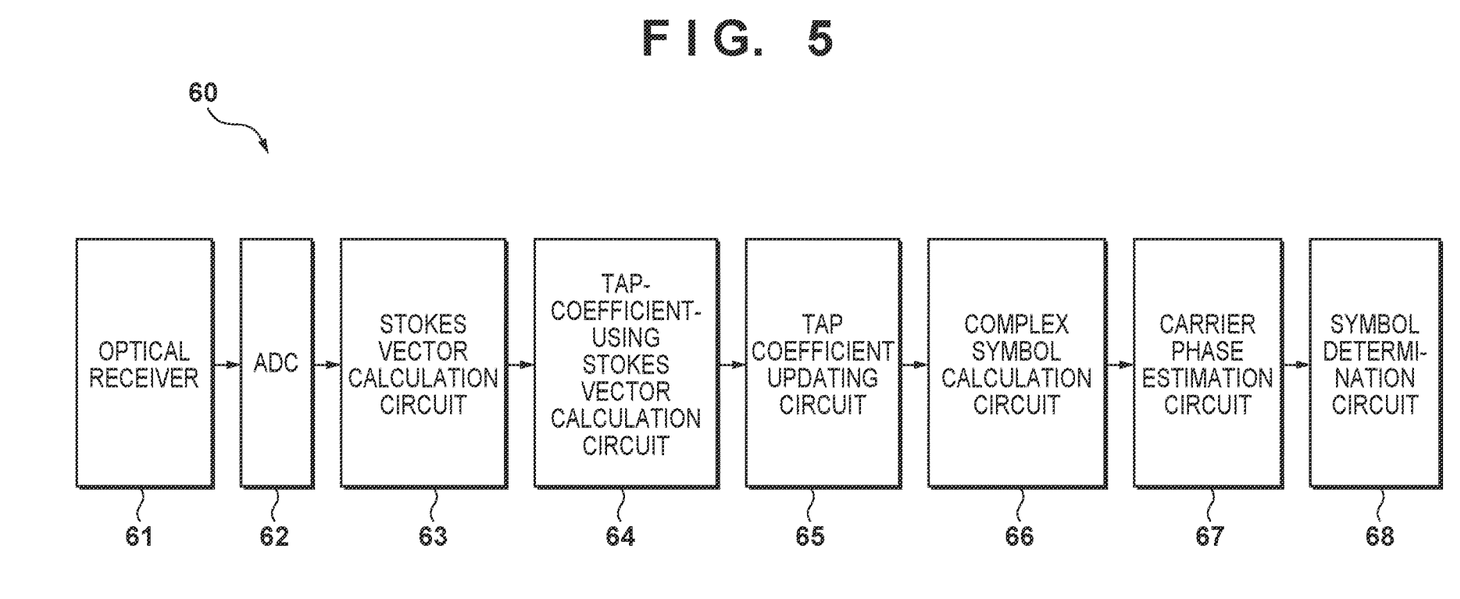
FIG. 5 is a diagram illustrating a schematic configuration of an optical receiving device disclosed in Non-Patent Literature 1.

FIG. 5 is a diagram illustrating a schematic configuration of an optical receiving device disclosed in Non-Patent Literature 1. As illustrated in FIG. 5, an optical receiving device 60 includes an optical receiver 61, an analog-to-digital converter (ADC) 62, a Stokes vector calculation circuit 63, a tap-coefficient-using Stokes vector calculation circuit 64, a tap coefficient updating circuit 65, a complex symbol calculation circuit 66, a carrier phase estimation circuit 67, and a symbol determination circuit 68. In this optical receiving device 60, the randomly fluctuating polarization state is tracked in a blind state at all times mainly by the tap-coefficient-using Stokes vector calculation circuit 64 and the tap coefficient updating circuit 65.

In the tap-coefficient-using Stokes vector calculation circuit 64 and the tap coefficient updating circuit 65, polarization fluctuation-is tracked by using a 3×2 multiple-input and multiple-output (MIMO) configuration so that, by inputting three Stokes parameters, two real numbers (or an imaginary number in which one of two real numbers constitutes a real part and the other constitutes an imaginary part) are output while updating tap coefficients as appropriate.

Specifically, in the tap-coefficient-using Stokes vector calculation circuit 64, an output Stokes vector is calculated using tap coefficients constituted by three complex numbers (or six real numbers). Next, the tap coefficients are updated by the tap coefficient updating circuit 65 in accordance with update formulas corresponding to respective algorithms. In updating the tap coefficients, a least mean square (LMS) algorithm or a constant modulus algorithm (CMA) is used, but when blind equalization is performed, it is required that CMA is used and that carrier phase estimation is subsequently performed.

In Non-Patent Literature 2, random polarization fluctuation is tracked by using a 3×1 multiple-input and single-output (MISO) configuration in which a complex signal is output by inputting three Stokes parameters, as in Non-Patent Literature 1. However, despite the "single-output", this configuration is not essentially different from the 3×2 MIMO configuration in Non-Patent Literature 1 since dealing with a complex signal is substantially equivalent to dealing with two real numbers, in Non-Patent literature 2, LMS is adopted as the algorithm for updating tap coefficients, and there is no description about a method for blind equalization.

CITATION LIST

Non-Patent Literature

Non-Patent Literature 1: Di Che, et al, "Polarization Demultiplexing for Stokes Vector Direct Detection," IEEE Journal of lightwave technology, Vol. 34, No.2, p754-p 760

Non-Patent Literature 2: R. S. Luis, et al, "Experimental demonstration of a polarization-insensitive self-homodyne detection receiver for optical access," Optical Communication on European Conference (ECOC) 2015, Tu.3.4.7

SUMMARY OF INVENTION

Technical Problem

However, in Non-Patent Literature 1 and Non-Patent literature 2, update formulas for six real number taps or three complex taps need to be calculated simultaneously when updating the tap coefficients according to MIMO, and therefore there is the problem of an increase in the circuit scale and an increase in the mounting cost.

Solution to Problem

According to an aspect of the present invention, a polarization tracking device that tracks polarization fluctuation of light transmitted through an optical fiber using a Stokes vector includes: a rotation angle updating unit configured to express a fluctuation amount of the Stokes vector on a Poincare sphere in an xy plane perpendicular to a travelling direction of a light wave using a first angle and a second angle, the first angle being an angle between a direction of an optical electric field of the light wave and a y axis, and the second angle being a phase difference between a component of the optical electric field in a direction of the y axis and a component of the optical electric field in a direction of an x axis orthogonal to the y axis; and an inverse rotation application unit configured to rotate the Stokes vector using an inverse polarization rotation matrix expressed with the first angle and the second angle.

Advantageous Effects of Invention

According to the present invention, polarization tracking can be performed by merely updating two real number parameters corresponding to a deflection angle in the Poincare sphere. As a result, it is possible to downsize the scale of the circuit for tracking and reduce the cost of circuit mounting.

Other features and advantages of the present invention will be apparent from the following description taken in conjunction with the accompanying drawings. Note that the same reference numerals denote the same or like components throughout the accompanying drawings.

DESCRIPTION OF EMBODIMENTS

The inventor of the present invention focused on the fact that when a phase shift keying (PSK) signal is imposed on a polarized wave, an optical carrier is imposed on another polarized wave, the average optical power is made equal therebetween, and the waves are detected by a self-homodyne receiver, every signal point is always located on the Poincare sphere in a plane where the Stokes parameter S1 is 0, but when random polarization rotation occurs in the optical signal during transmission through an optical fiber, the transmitted PSK signal loses the property of being located where S1 is 0 on the Poincare sphere. Based on this property, the inventor of the present invention found that the calculation amount can be reduced by applying inverse rotation such that the transmitted optical signal is located in the plane where the Stokes parameter S1 is 0, which lead to the present invention.

Principle of Polarization Tracking Device According to Present Embodiment

In an adaptive equalization algorithm, equalization of a signal is performed by weighting the signal and updating the weight as appropriate so that a function that is called an objective function is at the minimum. An equalization method by which the objective function is determined using a feature common to signal points is called blind equalization. In the present embodiment blind equalization is applied to polarized wave separation in a self-homodyne receiver.

Generally, when a PSK signal is imposed on a polarized wave, an optical carrier is imposed on another polarized wave, the average optical power is made equal therebetween, and the waves are detected by a self-homodyne receiver, every signal point is always located on the Poincare sphere in the plane where the Stokes parameter S1=0. However, random polarization rotation during transmission causes the transmitted PSK signal to lose this property.

Accordingly, by determining an objective function that makes S1 converge to 0, it is possible to perform control such that the signal after convergence is located in the plane where S1=0. Even when S1 converges to 0, how S2 and S3 will be output cannot be controlled with the blind algorithm alone. However, uncertainty of S2 and S3 corresponds to uncertain phase rotation of a complex symbol at the time of self-homodyne wave detection, and can be resolved by a well-known method of raising an "M-phase PSK signal" to the M-th power.

First, the state of a Stokes vector moving on the Poincare sphere due to random polarization rotation during transmission is expressed using a Jones matrix. That is, provided that $\theta/2$ ($0 \leq \theta \leq \pi$) represents an angle between a direction of an optical electric field of an optical signal (light wave) and a y axis (slow axis) in a cross section of an optical fiber perpendicular to a propagation direction (travelling direction) of the optical signal, a Jones matrix that expresses coordinate transformation can be represented by the following formula.

[Formula 1]

$$\begin{pmatrix} \cos\theta/2 & -\sin\theta/2 \\ \sin\theta/2 & \cos\theta/2 \end{pmatrix} \quad (1)$$

Since $\theta/2$ in the Jones matrix corresponds to $\theta$ in the Stokes space, a matrix in the Stokes space is represented by the following formula.

[Formula 2]

$$\begin{pmatrix} \cos\theta & -\sin\theta & 0 \\ \sin\theta & \cos\theta & 0 \\ 0 & 0 & 1 \end{pmatrix} \quad (2)$$

On the other hand, a Jones matrix that expresses a phase difference $\varphi$ ($-\pi/2 \leq \varphi \leq \pi/2$) between an optical electric field component of the optical signal in the direction of an x axis (fast axis) orthogonal to the y axis and an optical electric field component of the optical signal in the direction of the y axis can be represented by the following formula.

[Formula 3]

$$\begin{pmatrix} e^{i\varphi/2} & 0 \\ 0 & e^{-i\varphi/2} \end{pmatrix} \quad (3)$$

A matrix in the Stokes space that corresponds to the above is represented by the following formula.

[Formula 4]

$$\begin{pmatrix} 1 & 0 & 0 \\ 0 & \cos\varphi & -\sin\varphi \\ 0 & \sin\varphi & \cos\varphi \end{pmatrix} \quad (4)$$

Therefore, the movement of the Stokes vector on the Poincare sphere can be represented by the following formula as a matrix that is a product of the above two 3×3 matrixes.

[Formula 5]

$$\begin{pmatrix} 1 & 0 & 0 \\ 0 & \cos\varphi & -\sin\varphi \\ 0 & \sin\varphi & \cos\varphi \end{pmatrix} \begin{pmatrix} \cos\theta & -\sin\theta & 0 \\ \sin\theta & \cos\theta & 0 \\ 0 & 0 & 1 \end{pmatrix} = \begin{pmatrix} \cos\theta & -\sin\theta & 0 \\ \cos\varphi\sin\theta & \cos\varphi\cos\theta & -\sin\varphi \\ \sin\varphi\sin\theta & \sin\varphi\cos\theta & \cos\varphi \end{pmatrix} \quad (5)$$

Accordingly, the following formula, which is an inverse matrix of the above, is generated at the receiver, and the received Stokes vector is multiplied by the inverse matrix.

[Formula 6]

$$\begin{pmatrix} \cos(-\theta) & -\sin(-\theta) & 0 \\ \sin(-\theta) & \cos(-\theta) & 0 \\ 0 & 0 & 1 \end{pmatrix} \begin{pmatrix} 1 & 0 & 0 \\ 0 & \cos(-\varphi) & -\sin(-\varphi) \\ 0 & \sin(-\varphi) & \cos(-\varphi) \end{pmatrix} = \begin{pmatrix} \cos(-\theta) & -\cos(-\varphi)\sin(-\theta) & \sin(-\varphi)\sin(-\theta) \\ \sin(-\theta) & \cos(-\varphi)\cos(-\theta) & -\sin(-\varphi)\cos(-\theta) \\ 0 & \sin(-\varphi) & \cos(-\varphi) \end{pmatrix} \quad (6)$$

Here, it is noted that $\theta$ and $\varphi$ are unknown at the receiver, and therefore inferred by a method described below. When the received Stokes vector is multiplied by the inverse polarization rotation matrix, the following formula can be obtained.

[Formula 7]

$$\begin{pmatrix} S'_1 \\ S'_2 \\ S'_3 \end{pmatrix} = \begin{pmatrix} \cos\theta & -\cos\varphi\sin\theta & \sin\varphi\sin\theta \\ \sin\theta & \cos\varphi\cos\theta & -\sin\varphi\cos\theta \\ 0 & \sin\varphi & \cos\varphi \end{pmatrix} \begin{pmatrix} S_1 \\ S_2 \\ S_3 \end{pmatrix} = \begin{pmatrix} \cos\theta S_1 - \cos\varphi\sin\theta S_2 + \sin\varphi\sin\theta S_3 \\ \sin\theta S_1 + \cos\varphi\cos\theta S_2 - \sin\varphi\cos\theta S_3 \\ \sin\varphi S_2 + \cos\varphi S_3 \end{pmatrix} \quad (7)$$

Here, an objective function that minimizes $S_1'$ is set as follows.

[Formula 8]

$$J = E[S_1'^2] \quad (8)$$

Update formulas for respective rotation angles are obtained through partial differentiation of the objective function with $\theta$ and $\varphi$. The results are as follows.

[Formula 9]

$\theta(k+1)=\theta(k)-\mu S_1(-\sin\theta S_1-\cos\theta\cos\varphi S_2+\cos\theta\sin\varphi S_3)$ $\varphi(k+1)=\varphi(k)-\mu \sin\theta S_1(\sin\varphi S_2+\cos\varphi S_3) \quad (9)$ When these rotation angles converge, the objective function represented by Formula (8) also converges to 0, and the polarization rotation angles are such that the signal is located in the plane where $S_1=0$.

First Embodiment

Figure 1:
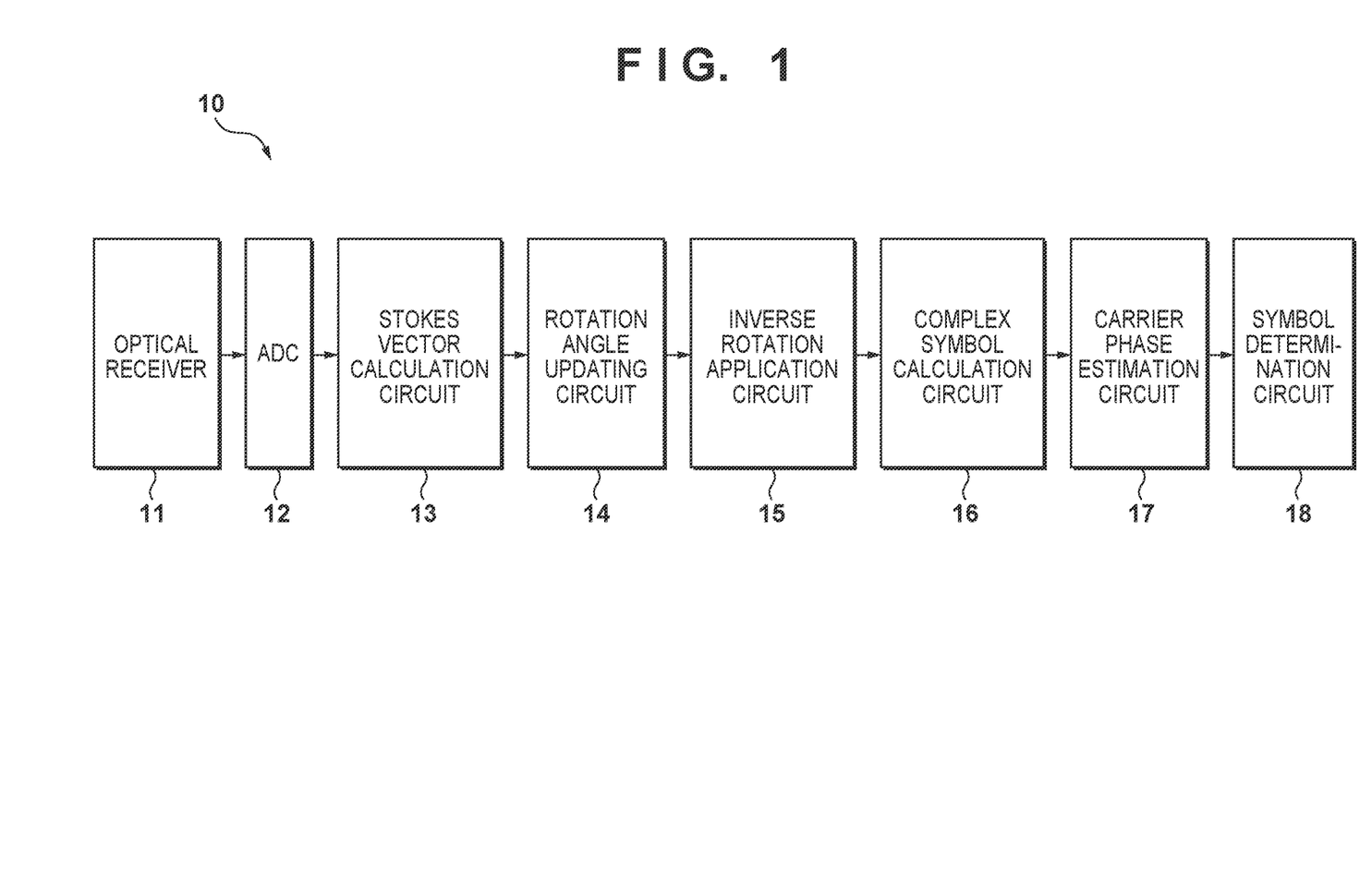
FIG. 1 is a diagram illustrating a schematic configuration of an optical receiving device according to a first embodiment.

FIG. 1 is a diagram illustrating a schematic configuration of an optical receiving device according to a first embodiment. An optical receiving device 10 includes an optical receiver 11, an analog-to-digital converter (ADC) 12, a Stokes vector calculation circuit 13, a rotation angle updating circuit 14 that updates two rotation angles, an inverse rotation application circuit 15 that applies inverse polarization rotation, a complex symbol calculation circuit 16, a carrier phase estimation circuit 17, and a symbol determination circuit 18. The rotation angle updating circuit 14 constitutes a rotation angle updating unit, and the inverse rotation application circuit 15 constitutes an inverse rotation application unit. The rotation angle updating circuit 14 and the inverse rotation application circuit 15 constitute a polarization tracking device.

Figure 2A:
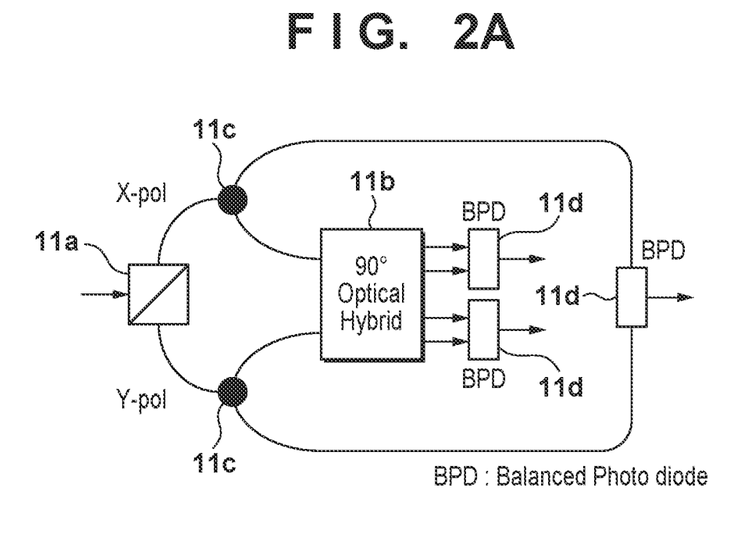
FIG. 2A is a diagram illustrating a schematic configuration of an optical receiver.
Figure 2B:
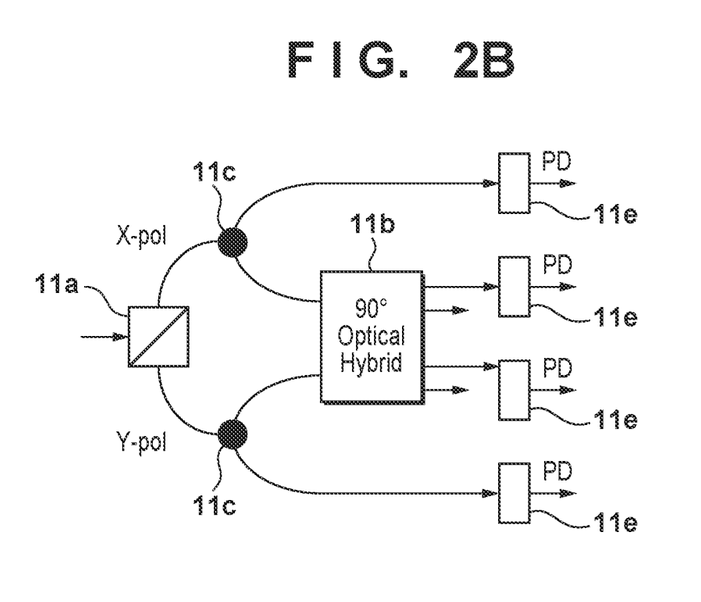
FIG. 2B is a diagram illustrating a schematic configuration of an optical receiver.

FIGS. 2A and 2B are diagrams each illustrating a schematic configuration of the optical receiver 11. As described in Non-Patent Literature 1, there are some configurations that the optical receiver 11 can take. Any of those configurations is applicable to the present invention. Here, it is assumed that the configuration of FIG. 2A is adopted, for example. The optical receiver 11 includes a polarization beam splitter (PBS) 11a, a 90° optical hybrid 11b, two optical couplers 11c, and three balanced photo diodes (BPD) 11d. Note that in the configuration illustrated in FIG. 2B, four photo diodes (PD) 11e are used instead of the three BPDs in FIG. 2A.

In the optical receiver 11, an optical signal transmitted through an optical fiber is split by the PBS 11a into an X polarization component and a Y polarization component, and each of these components is further split into halves by the optical couplers 11c. A half of the X polarization component and a half of the Y polarization component are input to the 90° optical hybrid 11b, and the BPDs 11d output electrical signals that are respectively proportional to a real axis component and an imaginary axis component of a complex symbol based on beat signals of the X polarization component and the Y polarization component.

Outputs from the optical couplers 11c corresponding to the other halves of the respective two polarization components are input to the BPD 11d that is not connected to the 90° optical hybrid 11b, and an electrical signal that is proportional to a difference between optical intensities of the respective polarization components is output.

FIG. 1, the ADC 12 converts analog electrical signals input from the optical receiver 11 to digital signals. The Stokes vector calculation circuit 13 outputs Stokes parameters "S0, S1, S2, S3" based on the digital signals input from the ADC 12. Specifically, the Stokes parameters "S0, S1, S2, S3" are calculated by the following formula.

[Formula 10]

$$\begin{pmatrix} S_0 \\ S_1 \\ S_2 \\ S_3 \end{pmatrix} = \begin{pmatrix} |X|^2 + |Y|^2 \\ |X|^2 - |Y|^2 \\ 2\mathrm{Re}(X \cdot Y^*) \\ 2\mathrm{Im}(X \cdot Y^*) \end{pmatrix} \quad (10)$$

Here X and Y represent components of an optical electric field separated by the PBS 11a illustrated in FIG. 2A. Specifically, X represents an optical electric field component in the x axis direction and Y represents an optical electric field component in the y axis direction. Each output from three ports of the optical receiver 11 corresponds as is to S1 to S3, and S0 is obtained by calculating the square root of the sum of squares of S1 to S3. Further, the rotation, angle updating circuit 14 illustrated in FIG. 1 updates inverse rotation angles on the Poincare sphere with the following formulas using the Stokes vector calculated by the Stokes vector calculation circuit 13.

[Formula 11]

$$\varphi(k+1) = \varphi(k) - \mu \sin \theta S_1 (\sin \varphi S_2 + \cos \varphi S_3)$$

$$\theta(k+1) = \theta(k) - \mu S_1 (-\sin \theta S_1 - \cos \theta \cos \varphi S_2 + \cos \theta \sin \varphi S_3) \quad (11)$$

As described above, $\theta$ ($0 \leq \theta \leq \pi$) represents the angle between the direction of the optical electric field and the y axis, and $\varphi$ ($-\pi/2 \leq \varphi \leq \pi/2$) represents the phase difference between the component of the optical electric field in the x axis direction and the component of the optical electric field in the y axis direction. $\mu$ is called a step size parameter and determines the tracking speed and tracking accuracy.

Further, the inverse rotation application circuit 15 illustrated in FIG. 1 rotates, based on the following formula, the Stokes vector calculated by the Stokes vector calculation circuit 13 by the two rotation angles $\varphi$ and $\theta$ calculated by the rotation angle updating circuit 14.

[Formula 12]

$$\begin{pmatrix} S_1' \\ S_2' \\ S_3' \end{pmatrix} = \begin{pmatrix} 1 & 0 & 0 \\ 0 & \cos\varphi & -\sin\varphi \\ 0 & \sin\varphi & \cos\varphi \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} S_1 \\ S_2 \\ S_3 \end{pmatrix} = \begin{pmatrix} \cos\theta & -\cos\varphi\sin\theta & \sin\varphi\sin\theta \\ \sin\theta & \cos\varphi\sin\theta & -\sin\varphi\cos\theta \\ 0 & \sin\varphi & \cos\varphi \end{pmatrix} \begin{pmatrix} S_1 \\ S_2 \\ S_3 \end{pmatrix} \quad (12)$$

"S0, S1, S2, S3" represent the Stokes vector before rotation, and "S0', S1', S2', S3'" represent the Stokes vector after rotation.

Further, the complex symbol calculation circuit 16 illustrated in FIG. 1 calculates a complex symbol based on the following formula using post-rotation Stokes parameters S2' and S3' calculated by the inverse rotation application circuit 15.

[Formula 13]

$$S'_2 + jS'_3 \quad (13)$$

The carrier phase estimation circuit 17 performs carrier phase estimation from the complex symbol calculated by the complex symbol calculation circuit 16 to remove phase noise. An algorithm that is usually used for the carrier phase estimation is a "method of raising the complex symbol to the M-th power", which is often used in demodulation of an M-phase PSK signal. Finally, the symbol determination circuit 18 performs symbol determination and decoding into bits.

As described above, according to the first embodiment, it is possible to perform blind polarization tracking by merely updating two real number parameters corresponding to a deflection angle in the Poincare sphere. Although polarization fluctuation tracking has been conventionally performed according to MIMO with six real number tap coefficients or three complex tap coefficients, according to the present embodiment, it is possible to perform blind polarization tracking by merely updating the two real number parameters corresponding to the deflection angle in the Poincare sphere, and therefore the circuit scale can be downsized and the cost of circuit mounting can be reduced.

Second Embodiment

Although tap coefficient update formulas in an adaptive filter are obtained by partial differentiation of an objective function with respect to taps, in the case where the objective function has a local extreme value, depending on an initial value, convergence to the local extreme value may occur instead of convergence to an extreme value at which the convergence is aimed. In the case of blind polarized wave separation, this problem is known as a polarization singularity problem, which may occur in the present embodiment depending on initial polarization rotation. Therefore, a measure for avoiding the polarization singularity problem that uses a training signal is employed in a second embodiment.

Figure 3:
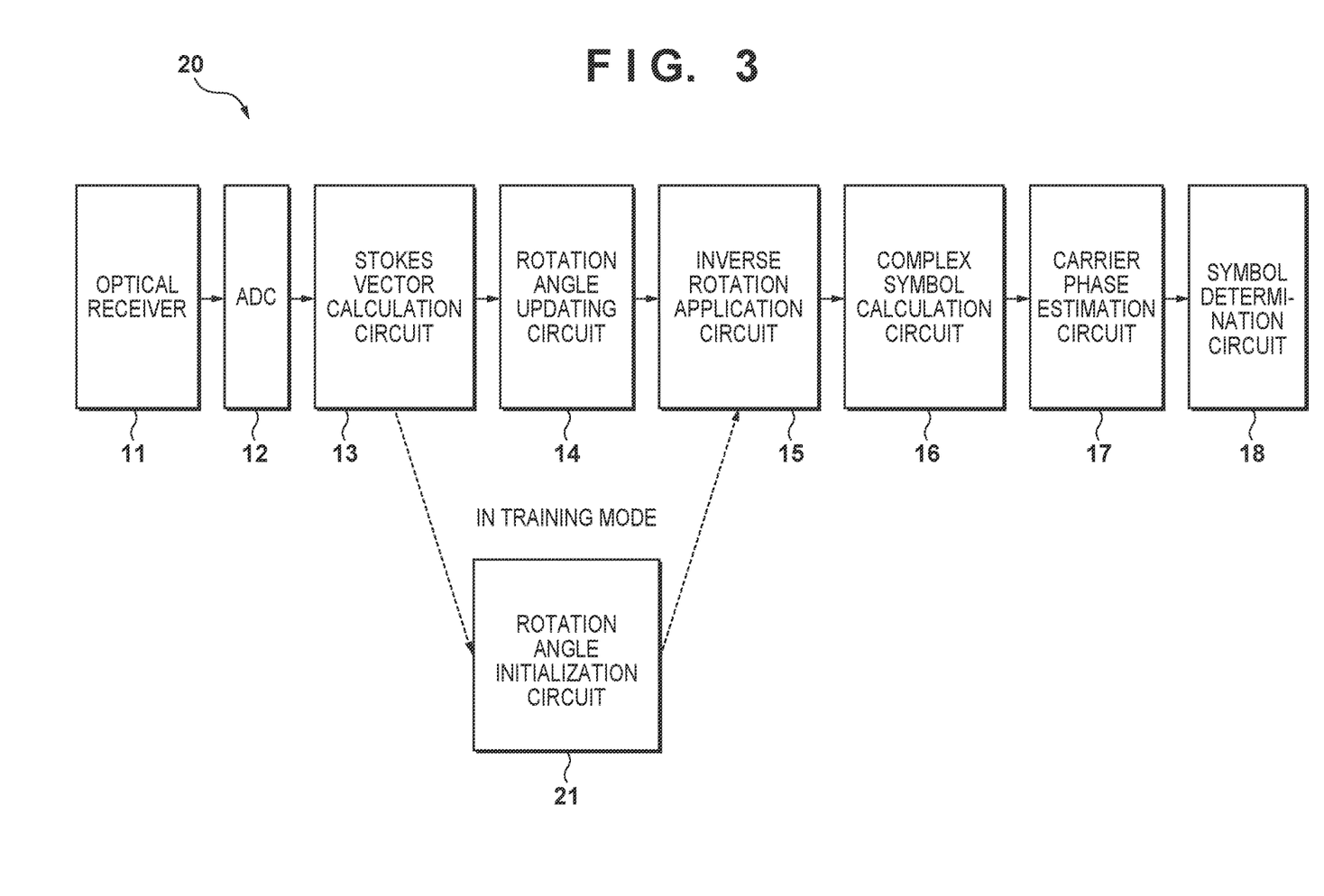
FIG. 3 is a diagram illustrating a schematic configuration of an optical receiving device 20 according to a second embodiment.

FIG. 3 is a diagram illustrating a schematic configuration of an optical receiving device 20 according to the second embodiment. The optical receiving device 20 differs from the optical receiving device 10 according to the first embodiment in that the optical receiving device 20 includes a rotation angle initialization circuit 21 that determines initial values of rotation angle using a known training signal. The configuration of the optical receiving device 20 is similar to that in the first embodiment in all aspects other than the above, and therefore a description thereof will be omitted.

Through the use of a known training Stokes vector, it is possible to calculate rotation angles $\theta$ and $\varphi$ on the Poincare sphere in the transmission path at that moment. However, the Stokes vector at the time of reception generally includes noise other than polarization rotation. Therefore, it is necessary to reduce the influence of noise by transmitting the training signal several times and taking the average of the several instances of transmission. Here, it is assumed that polarization fluctuation is approximately constant during the several instances of transmission of the training signal. This assumption is sufficiently valid since the symbol rate of a signal is actually much faster than the rate of polarization fluctuation. Inverse rotations of polarization rotation angles determined from the training signal are set as initial values of the two rotation angles.

As described above, according to the second embodiment, the rotation angles are updated from correct inverse polarization rotation angles, and therefore the polarization singularity problem can be avoided.

Third Embodiment

Figure 4:
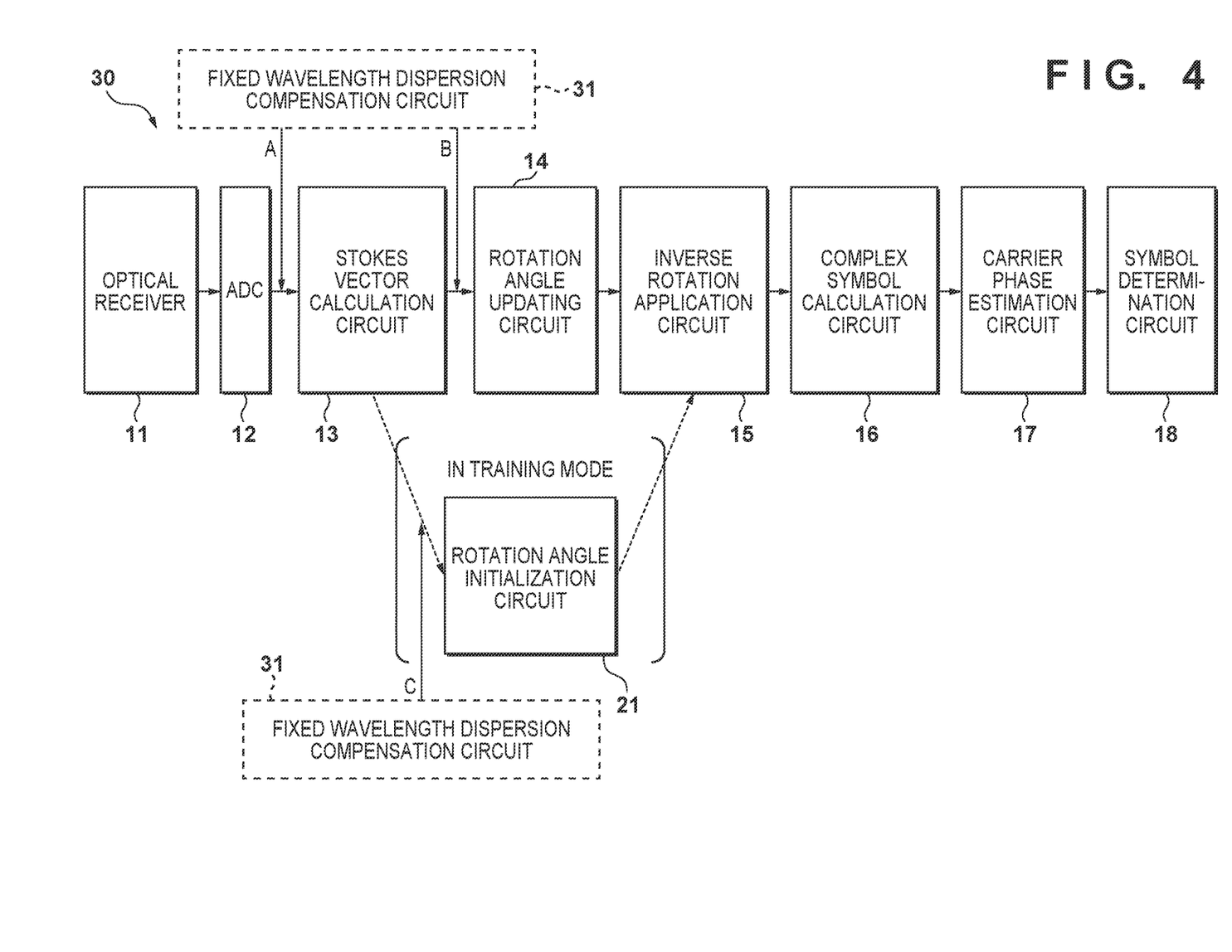
FIG. 4 is a diagram illustrating a schematic configuration of an optical receiving device according to a third embodiment.

FIG. 4 is a diagram illustrating a schematic configuration of an optical receiving device according to a third embodiment. An optical receiving device 30 according to the third embodiment includes a fixed wavelength dispersion compensation circuit 31 that performs fixed wavelength dispersion compensation on light transmitted through an optical fiber. The fixed wavelength dispersion compensation circuit 31 can be located at the position A or the position B in FIG. 4. However, in the case where a training mode according to the second embodiment is used, the fixed wavelength dispersion compensation circuit 31 is located at the position C.

The fixed wavelength dispersion compensation circuit 31 can employ a method of performing convolution the time domain using a finite impulse response (FIR) filler and a method of performing Fourier transformation of an input signal and multiplying the signal by an inverse transfer function to return the signal to the time domain through inverse Fourier transformation. Either of these methods may be employed in the third embodiment.

In the case where the fixed wavelength dispersion compensation circuit 31 is located at the position A, either of the above methods is performed on digitalized outputs from the 90° hybrid. In the case where the fixed wavelength dispersion compensation circuit 31 is located at the position B, either of the above methods is performed on the Stokes parameters S2 and S3 that are normalized with S0.

According to the third embodiment, fixed wavelength dispersion compensation is performed on the light transmitted through the optical fiber, and thus a waveform that is not affected by wavelength dispersion upon transmission can be obtained upon reception.

Fourth Embodiment

The first embodiment was described only assuming the case where the modulation signal is a PSK signal. That is, in the case where a PSK signal is imposed on a polarized wave, a carrier is imposed on another polarized wave, and the average optical power is equal therebetween, every symbol point of the PSK signal is located in the Stokes space where S1=0. The first embodiment performs blind polarization tracking using this property.

In contrast, the fourth embodiment relates to a case where a modulation scheme that has multiple amplitude patterns is used. Quadrature amplitude modulation (QAM) is an example of such modulation schemes. For example, with respect to an optical signal of which an 8QAM signal that has two amplitude patterns is imposed on a polarized wave and a carrier is imposed on another polarized wave, S1 in the Stokes space takes two values that correspond to two amplitudes.

Therefore, it is necessary to update the two rotation angles by determining to which of the amplitudes the received signal belongs, that is, to which of the two S1 values the received signal belongs. While update formulas for the case where S1 becomes x are represented by Formula (11), update formulas for the case where S1 is a given value χ are represented as follows.

[Formula 14]

$$\varphi(k+1) = \varphi(k) - \mu \sin\theta(S_1-\chi)(\sin\varphi S_2 + \cos\varphi S_3)$$

$$\theta(k+1) = \theta(k) - \mu(S_1-\chi)(-\sin\theta S_1 - \cos\theta\cos\varphi S_2 + \cos\theta\sin\varphi S_3) \qquad (14)$$

After calculating S1 of the received signal, it is determined which of a plurality of S1 values each corresponding to an amplitude value is closest to the calculated S1. After the determination, blind polarization tracking is performed based on the closest S1 value using the above update formulas for the rotation angles.

As described above, although polarization fluctuation tracking has been conventionally performed according to MIMO with six real number tap coefficients or three complex tap coefficients, the present embodiment enables blind polarization tracking by merely updating the two real number parameters corresponding to the deflection angle in the Poincare sphere, and therefore enables downsizing of the circuit scale and a reduction in the cost of circuit mounting.

Note that the present invention can be realized by a program that causes an optical receiving device to perform the above-described tracking method when the program is executed by a processor of the optical receiving device. The computer program can be stored in a computer readable storage medium to be distributed or can be distributed via a network.

The present invention is not limited to the above embodiments and various changes and modifications can be made within the spirit and scope of the present invention. Therefore, to apprise the public of the scope of the present invention, the following claims are made.

The invention claimed is:

1. A polarization tracking device that tracks polarization fluctuation of light transmitted through an optical fiber using a Stokes vector, comprising:
    a rotation angle updating unit configured to express a fluctuation amount of the Stokes vector on a Poincare sphere in an xy plane perpendicular to a travelling direction of a light wave using a first angle and a second angle, the first angle being an angle between a direction of an optical electric field of the light wave and a y axis, and the second angle being a phase difference between a component of the optical electric field in a direction of the y axis and a component of the optical electric field in a direction of an x axis orthogonal to the y axis; and
    an inverse rotation application unit configured to rotate the Stokes vector using an inverse polarization rotation matrix expressed with the first angle and the second angle.

2. The polarization tracking device according to claim 1, wherein, with respect to an optical modulation signal that is modulated using a phase modulation scheme, the rotation angle updating unit calculates θ and φ using a formula (2),
    where S0, S1, S2, and S3 defined by a formula (1) represent Stokes parameters,
    X represents the component of the optical electric field in the direction of the x axis, and Y represents the component of the optical electric field in the direction of the y axis,
    θ (0≤θ≤π) represents the first angle,
    φ (−π/2≤φ≤π/2) represents the second angle, and
    μ represents a step size parameter that determines a tracking speed and tracking accuracy

[Formula 1]

$$\begin{pmatrix} S_0 \\ S_1 \\ S_2 \\ S_3 \end{pmatrix} = \begin{pmatrix} |X|^2 + |Y|^2 \\ |X|^2 - |Y|^2 \\ 2\mathrm{Re}(X \cdot Y^*) \\ 2\mathrm{Im}(X \cdot Y^*) \end{pmatrix} \qquad (1)$$

[Formula 2]

$$\varphi(k+1) = \varphi(k) - \mu\sin\theta S_1(\sin\varphi S_2 + \cos\varphi S_3) \qquad (2)$$
$$\theta(k+1) = \theta(k) - \mu S_1(-\sin\theta S_1 - \cos\theta\cos\varphi S_2 + \cos\theta\sin\varphi S_3).$$

3. The polarization tracking device according to claim 1, wherein, with respect to an optical modulation signal that is modulated using an amplitude modulation scheme, the rotation angle updating unit calculates θ and φ using a formula (4),
    where S0, S1, S2, and S3 defined by a formula (3) represent Stokes parameters,
    X represents the component of the optical electric field in the direction of the x axis, and Y represents the component of the optical electric field in the direction of the y axis, θ (0≤θ≤π) represents the first angle, φ (−π/2≤φ≤π/2) represents the second angle, μ represents a step size parameter that determines a tracking speed and tracking accuracy, and x represents a given value

[Formula 3]

$$\begin{pmatrix} S_0 \\ S_1 \\ S_2 \\ S_3 \end{pmatrix} = \begin{pmatrix} |X|^2 + |Y|^2 \\ |X|^2 - |Y|^2 \\ 2\mathrm{Re}(X \cdot Y^*) \\ 2\mathrm{Im}(X \cdot Y^*) \end{pmatrix} \quad (3)$$

[Formula 4]

$$\varphi(k+1) = \varphi(k) - \mu \sin\theta (S_1 - x)(\sin\varphi S_2 + \cos\varphi S_3)$$
$$\theta(k+1) = \theta(k) - \mu(S_1 - x)(-\sin\theta S_1 - \cos\theta\cos\varphi S_2 + \cos\theta\sin\varphi S_3). \quad (4)$$

4. An optical receiving device comprising the polarization tracking device according to claim 1.

5. The optical receiving device according to claim 4, further comprising an initialization unit configured to initialize the first angle and the second angle using a training signal.

6. The optical receiving device according to claim 4, further comprising a compensation unit configured to perform fixed wavelength dispersion compensation on light transmitted through an optical fiber.

7. A non-transitory computer readable storage medium including a program for tracking polarization fluctuation of light transmitted through an optical fiber using a Stokes vector, wherein, when the program is executed by at least one processor of an optical receiving device, the program causes the optical receiving device to perform:

processing for expressing a fluctuation amount of the Stokes vector on a Poincare sphere in an xy plane perpendicular to a travelling direction of a light wave using a first angle and a second angle, the first angle being an angle between a direction of an optical electric field of the light wave and a y axis, and the second angle being a phase difference between a component of the optical electric field in a direction of the y axis and a component of the optical electric field in a direction of an x axis orthogonal to the y axis; and processing for rotating the Stokes vector using an inverse polarization rotation matrix expressed with the first angle and the second angle.

8. A polarization, tracking method for tracking polarization fluctuation of light transmitted through an optical fiber using a Stokes vector, comprising:

expressing a fluctuation amount of the Stokes vector on a Poincare sphere in an xy plane perpendicular to a travelling direction of a light wave using a first angle and a second angle, the first angle being an angle between a direction of an optical electric field of the light wave and a y axis, and the second angle being a phase difference between a component of the optical electric field in a direction of the y axis and a component of the optical electric field in a direction of an x axis orthogonal to the y axis; and rotating the Stokes sector using an inverse polarization rotation matrix expressed with the first angle and the second angle.

\* \* \* \* \*